United States Patent
Kuzmin

(10) Patent No.: US 11,477,379 B2
(45) Date of Patent: Oct. 18, 2022

(54) INFRARED NIGHT VISION SYSTEM

(71) Applicant: OBSHESTVO S OGRANICHENNOI OTVETSTVENNOSTYU "IRVEI", Moscow (RU)

(72) Inventor: Maxim Yaroslavich Kuzmin, Ekaterinburg (RU)

(73) Assignee: OBSHESTVO S OGRANICHENNOI OTVETSTVENNOSTYU "IRVEI", Moscow (RU)

( * ) Notice: Subject to any disclaimer, the term of this patent is extended or adjusted under 35 U.S.C. 154(b) by 0 days.

(21) Appl. No.: 17/283,666

(22) PCT Filed: Oct. 4, 2019

(86) PCT No.: PCT/RU2019/050173
§ 371 (c)(1),
(2) Date: Apr. 8, 2021

(87) PCT Pub. No.: WO2020/076192
PCT Pub. Date: Apr. 16, 2020

(65) Prior Publication Data
US 2021/0360158 A1 Nov. 18, 2021

(30) Foreign Application Priority Data
Oct. 8, 2018 (RU) ............ RU2018135358

(51) Int. Cl.
*H04N 5/232* (2006.01)
*H04N 7/18* (2006.01)

(52) U.S. Cl.
CPC ..... *H04N 5/23245* (2013.01); *H04N 5/23203* (2013.01); *H04N 7/18* (2013.01)

(58) Field of Classification Search
CPC ... H04N 5/23245; H04N 5/23203; H04N 7/18
See application file for complete search history.

(56) References Cited

U.S. PATENT DOCUMENTS

| | | | | |
|---|---|---|---|---|
| 6,825,469 | B2 * | 11/2004 | Yamaguchi | B60Q 1/14 250/330 |
| 7,084,570 | B2 * | 8/2006 | Oyaski | B60Q 1/04 307/10.8 |

(Continued)

FOREIGN PATENT DOCUMENTS

RU 121092 U1 * 10/2012

*Primary Examiner* — Boubacar Abdou Tchoussou
(74) *Attorney, Agent, or Firm* — Rutman IP

(57) ABSTRACT

This invention relates to optical observation with a lack of light. The infrared night vision system comprises a visible light source, head control unit, visible to infrared range switching unit, a night vision camera, reflective screen and device for displaying graphic information on a reflective screen. The head control unit comprises controllers for system data processing and graphic information processing and is equipped with a remote control device of the infrared night vision system. The switching unit comprises a data processing controller, voltage switch of the visible light source, brightness controller and activation control signal type switch of the visible light source. It ensures the ability of remote activation of the system and application of the system in overland cargo, water and air transport.

20 Claims, 5 Drawing Sheets

(56) References Cited

U.S. PATENT DOCUMENTS

Figure 1:
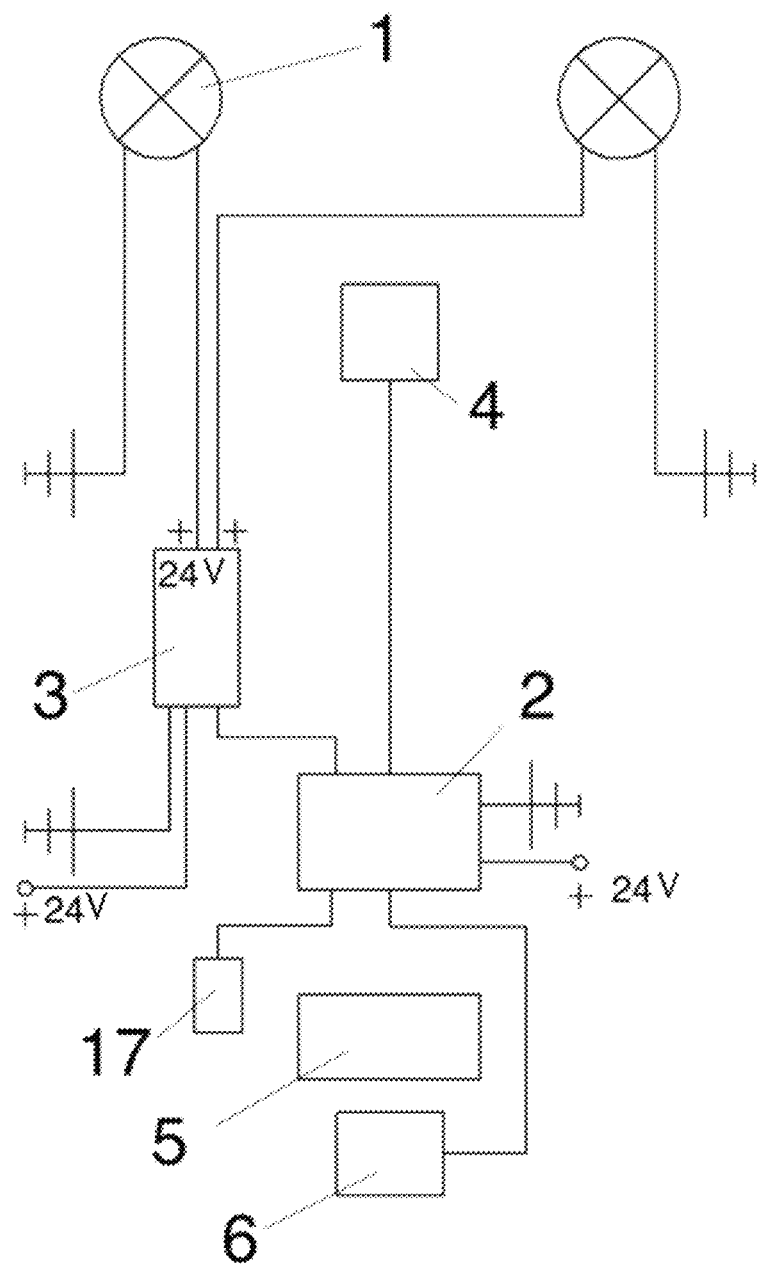

| | | | |
|---|---|---|---|
| 7,446,488 B1* | 11/2008 | Cross | H05B 41/288 |
| | | | 315/308 |
| 9,726,333 B2* | 8/2017 | Giametta | B60Q 1/0052 |
| 2003/0025078 A1* | 2/2003 | Yamaguchi | H05B 47/11 |
| | | | 250/330 |
| 2003/0160153 A1 | 8/2003 | Hara et al. | |
| 2003/0173517 A1* | 9/2003 | Seto | G01S 17/02 |
| | | | 250/330 |
| 2005/0248283 A1* | 11/2005 | Oyaski | B60Q 3/80 |
| | | | 315/82 |
| 2008/0029701 A1 | 2/2008 | Onozawa et al. | |
| 2009/0040297 A1* | 2/2009 | Harada | G02F 1/133509 |
| | | | 348/54 |
| 2010/0289632 A1 | 11/2010 | Seder et al. | |
| 2011/0115287 A1* | 5/2011 | Morita | B60R 16/033 |
| | | | 307/9.1 |
| 2017/0299127 A1* | 10/2017 | Giametta | B60Q 1/0052 |
| 2019/0121051 A1* | 4/2019 | Byrne | H04N 5/2254 |
| 2020/0346726 A1* | 11/2020 | Zheng | B63B 35/00 |

* cited by examiner

INFRARED NIGHT VISION SYSTEM

The invention relates to optical observation with a lack of light and can be applied for dynamic observation in overland, water and air transport.

There is a known standard infrared night vision system for a passenger car, which includes infrared modules installed in the front bumper, a night vision video camera, a projector installed in the dashboard, an infrared source control unit designed to allow conversion of a signal from the night vision camera into a graphic image of the projector [US2003160153, date of publication: 28.08.2003, IPC: B60R 11/04, B60R 21/00, H04N 5/202].

There is a known standard system for displaying graphic images from a night vision camera on the windshield of a vehicle, which includes infrared sources, a night vision video camera, reflective film, a projector, a head control unit of the system for displaying graphic images designed to allow conversion of images from the night vision camera to images displayed on the windshield of a vehicle [US2010289632, date of publication: 18.11.2010, IPC: B60Q 1/00, G06T 7/00, G09G 5/00].

The chosen prototype is an infrared night vision system of a passenger car, which includes high beam headlamps of a passenger car, a head control unit, a visible to infrared range switching unit, a night vision camera, a reflective screen, a monitor display for displaying data on a reflective screen. The head control unit comprises a system data processing controller and a graphic information controller; the visible to infrared range switching unit comprises a data processing controller, while the system electronic components are interconnected by wires [RU121092, date of publication: 20.03.2015, IPC: G02F 1/01].

A common disadvantage of the prototype and known technical solutions is the impossibility to install the system designed for operating with visible light sources of a passenger car on trucks, excavators, tractors, as well as on small craft, boats, drones and quadcopters. This is due to the fact that all of these vehicles have different on-board voltage and, accordingly, different power voltage of visible light sources, which should be switched to the infrared range to ensure the functioning of the infrared night vision system, while visible light sources of each vehicle have a different scheme of connection to the on-board electric system. If the system is used in aircraft, remote activation and control of the system are required in some cases. The scope of application is largely limited by this disadvantage.

The technical challenge to be solved by the invention is to expand the functionality and the scope of application of the infrared night vision system.

The technical result to be achieved by the invention is to ensure the ability of remote activation of the system and the use of the system in overland cargo, water and air transport.

The essence of the invention consists in the following.

The infrared night vision system comprises a visible light source, a head control unit, a visible to infrared range switching unit, a night vision camera, a reflective screen and a device for displaying graphic information on a reflective screen. The head control unit comprises controllers for system data processing and graphic information processing; the visible to infrared range switching unit comprises a data processing controller, while the electronic components are interconnected by communication means. As opposed to the prototype, the head control unit is equipped with a remote control device of the infrared night vision system, the visible to infrared range switching unit comprises a voltage switch of the visible light source, a brightness controller of the visible light source in the infrared range and an activation control signal type switch of the visible light source.

The visible light source allows illuminating objects with a lack of light. The visible light source can be standard halogen and/or LED low and/or high beam headlamps of a vehicle, LED modules, panels, etc.

The head control unit ensures the system performance and comprises a system data processing controller and a graphic information processing controller. The system data processing controller allows controlling the system electronic components by transmitting control signals. The graphic information processing controller allows converting the input data from the night vision camera into the output data in the device for displaying graphic information. The controllers can be in the form of processors and integrated circuits of the corresponding purpose.

The head control unit comprises power connectors of the night vision camera, the visible to infrared range switching unit and the device for displaying graphic information on a reflective screen. The head control unit may comprise connectors for an additional night vision camera and an additional device for displaying graphic information.

The head control unit is equipped with a remote control device of the system, which allows changing the parameters of each electronic component of the system. The system remote control can have the form of wireless and/or wired devices. Wireless devices ensure the remote control of the systems installed on drones and quadcopters via Bluetooth, Wi-Fi, radio channel, etc., and could be in the form a smartphone, a tablet, etc. Wired devices ensure the ability to control the system in close proximity and allow reducing the risk of interference during data transmission from the device to the control unit, increasing the reliability of the system due to the lack of batteries in such devices. Wired devices could be in the form a control panel, a joystick, etc. Wired devices comprise means for data input into the head control unit, which can be in the form of a touchpad or a touch screen. In order to increase the system reliability, the data input means could have the form of buttons, while the wired device could have a waterproof case.

In addition, the head control unit may comprise means of protection from voltage swing or short circuit in the on-board circuit for protection from moisture. These could be safety fuses and/or thermal and/or electromagnetic switches.

The visible to infrared range switching unit comprises a data processing controller, which allows getting signals from the head unit, activating the unit and switching the visible light source to the infrared range and can have the form of a processor or an integrated circuit. The visible to infrared range switching unit comprises a connector to the visible light source. The number of connectors may vary depending on the number of sources. The switching unit may comprise connectors for connecting power from an external power source and/or from the system head control unit. The switching unit may also comprise a connector to the control signal or the control signal may be transmitted via power supply connectors. The switching unit may comprise an illumination sensor that allows determining the illumination of the environment. It can be mounted on the unit or separately from the unit.

The voltage switch of visible light sources ensures the application of the system with visible light sources installed, for example, on a truck, excavator, boat, drone, etc., with different on-board voltage for the purpose of switching them to the infrared range. The voltage switch of visible light sources can be an additional controller equipped with software and/or a control unit controller with an option to switch power voltage of the visible light source. An additional controller equipped with software ensures the ability of switching the power voltage automatically when connecting to the visible light source system. The controller of the visible light source control unit designed to switch power voltage of the visible light source allows reducing the mass-dimensional characteristics of the system and using the system in sports quadcopters and other aircraft of small capacity. In order to increase the accuracy when choosing the power voltage of the infrared light source, the switching unit may comprise such switching elements as a multiple-position switch, a rheostat or a potentiometer.

The brightness controller of the visible light source in the infrared range allows smoothly changing the power of the visible light source depending on the initial power and the degree of illumination of the environment and reducing the risk of excessive illumination in the infrared range. The brightness controller may comprise an illumination sensor, mounted on the unit or separately from the unit, ensuring the ability to determine the illumination of the environment. The brightness controller can be an additional controller equipped with software and connected to the illumination sensor (if any) and/or switching elements connected to the control unit controller. Switching elements can have the form of a multiple-position switch, a rheostat or a potentiometer. Moreover, in order to improve the accuracy of incremental increase or reduction of power of an infrared light source, switching elements can have the form of functional keys to increase and reduce the brightness of the infrared light source.

The activation control signal type switch of the visible light source ensures the application of the system with a visible light source already connected to the on-board electrical system of the vehicle and is controlled by "plus" or by "minus" ("by mass"). The control signal type switch can be automatic and/or manual. The automatic control signal type switch can be in the form of a controller equipped with software or an automatic relay, etc. The manual control signal type switch can be in the form of a two-position switch or a potentiometer. In addition, in order to simplify the design of the switching unit, the manual control signal type switch can be in the form of connectors of the corresponding type ("plus" or "minus") of the output control signal.

The night vision camera ensures the ability to convert the image of an object illuminated by a visible light source in the infrared range into an analog or digital video signal. The night vision camera comprises a lens, a light-sensitive matrix and a means for transmitting a video signal to the head control unit. The lens can be removable, which allows replacing it depending on the application of the system, i.e. on the focal distance to the object and the rate of change of distance to the object illuminated by the light source. The lens can be dismountable, which allows replacing lenses depending on the system application. The video signal transmitting device can be in the form of wireless communication elements, for example, Bluetooth, Wi-Fi, or a connector to the head control unit. The camera may comprise a power supply connector or may have its own power source in the form of a rechargeable battery.

The device for displaying graphic information on a reflective screen allows converting the video signal from the head control unit into a user-friendly form. The device for displaying graphic information comprises a power connector and a connector to the head control unit. The device for displaying graphic information can be in the form of a monitor display and/or a projector. The dimensions of the device for displaying graphic information depend on the application of the system and the place of its installation.

The reflective screen displays the image of an object illuminated by a visible light source in the infrared range. The reflective screen can be made of film based on Iavsan, polyester or polypropylene. The film may comprise elements for attachment to surfaces, such as double-sided adhesive tape or an adhesive layer. In addition, the reflective screen can be mounted on a retainer in the form of glass or a stretcher, which makes the installation of the reflective screen easier in the absence of an appropriate surface.

The system electronic components comprise cases that ensure their structural integrity. The cases can be made of such construction materials as metal, plastic or composite material. The cases can be dismountable in order to make the installation of the system easier in hardly accessible places or solid in order to reduce the risk of component damage. The cases can be sealed if the system is exposed to moisture and dust. The cases may comprise fixing elements to ensure the installation of the system components in the required place. These can be eyelets, brackets, holders, etc. The configuration of the fixing elements may vary depending on the application of the system.

The communication means allow transmitting data between the system electronic components and can be in the form of wires or optical cables or wireless devices, for example, Bluetooth or Wi-Fi modules.

The invention has the following distinctive features unknown in the prior art:
- the head control unit is equipped with a remote control device of the infrared night vision system, which allows activating the system remotely and making adjustments to its operation;
- the visible to infrared range switching unit comprises a voltage switch of the visible light source, which allows adjusting the system for operation with visible light sources with different power voltages;
- the visible to infrared range switching unit comprises a brightness controller of the visible light source in the infrared range, which allows adjusting the power of infrared illumination automatically or manually depending on the illumination of the environment;
- the control unit of the infrared light source comprises a switch of the type of activation control signal of the visible light source, which allows applying the system with visible light sources with different type of activation signal.

The essential distinctive features of the invention allow activating the system remotely and making adjustments to its operation, adjusting the system for operation with visible light sources with different power voltages, adjusting the power of infrared illumination automatically or manually depending on the illumination of the environment and applying the system with visible light sources with different type of activation signal. This ensures the ability to connect and use the system in water, overland and air transport with different power voltage (5 to 36 V) and operated in different light environment, also enabling connection of the system to the on-board electrical system for activation of standard visible light sources of a vehicle with activation control by "plus" or "minus".

This allows achieving the technical result, which is the remote activation of the system and its application in overland cargo, water and air transport, thus expanding the functionality and the scope of application of the night vision system of a passenger car.

The presence of new essential distinctive features indicates that the invention meets the patentability criterion of "novelty".

The essential features of the invention allow achieving a synergistic effect, which is a significant expansion of the scope of application of the infrared night vision system of a passenger car by expanding its functionality. This is due to the fact that the remote control of the infrared night vision system allows controlling the system remotely; the voltage switch of the visible light source allows adjusting the system for visible light sources with any power voltage; the brightness controller of the visible light source in the infrared range allows adjusting the power of infrared illumination of air, land and water objects in different environments with different refraction indices and content of suspended solid particles; the activation control signal type switch of the visible light source allows connecting the system to a visible light source with different control types. These functions allow applying the system in overland vehicles, for example, in motorcycles, buses, trucks, tractors, excavators, etc., in water transport, for example, in boats, yachts, etc., in air transport, for example, in hang gliders, drones, quadcopters, including when remote control is required, for example, for observation of wild animals. We may therefore deduce that the invention meets the patentability criterion of "inventive step".

The invention can be implemented using known means, materials and technologies, which indicates that the invention meets the patentability criterion of "industrial applicability".

The invention is illustrated by the following figures.

FIG. 1—Diagram of the infrared night vision system connected to the on-board electrical system of a truck and standard high-beam LED lamps.

Figure 2:
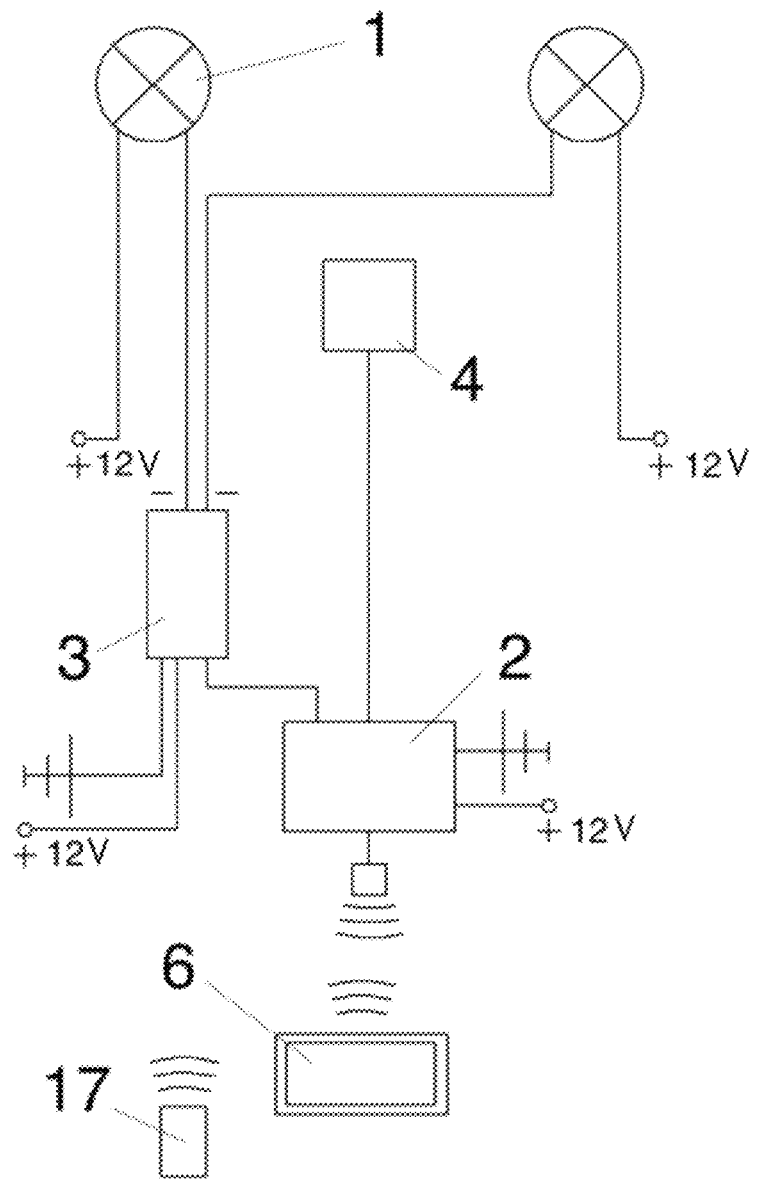

FIG. 2—Diagram of the infrared night vision system connected to the on-board electrical system of a quadcopter and its standard LED illumination for observation of wild animals.

Figure 3:
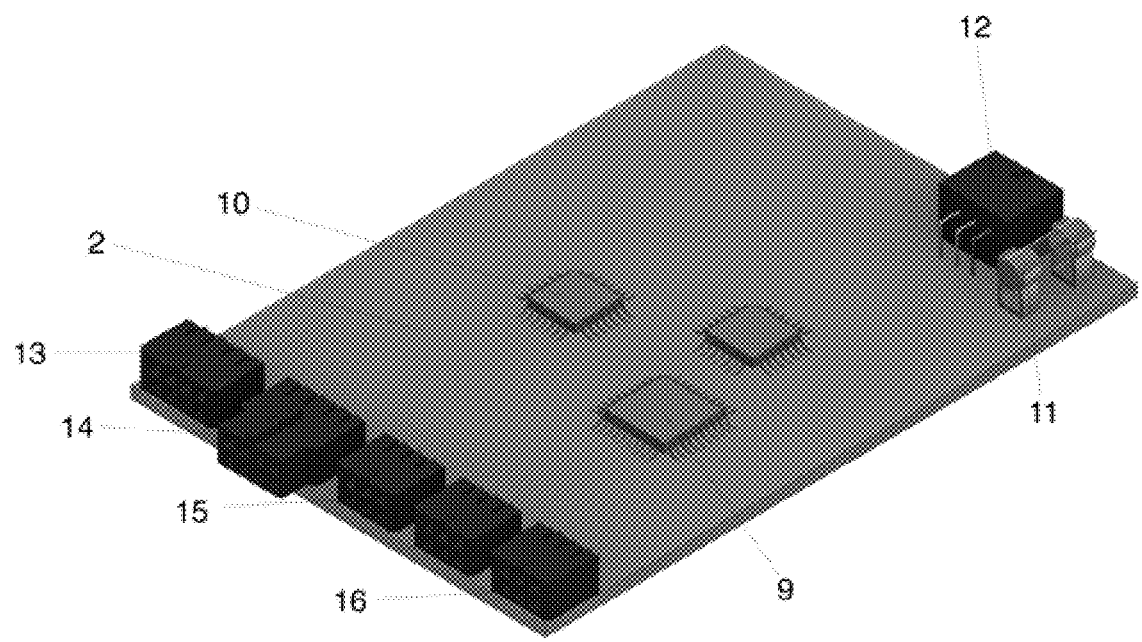
Figure 4:
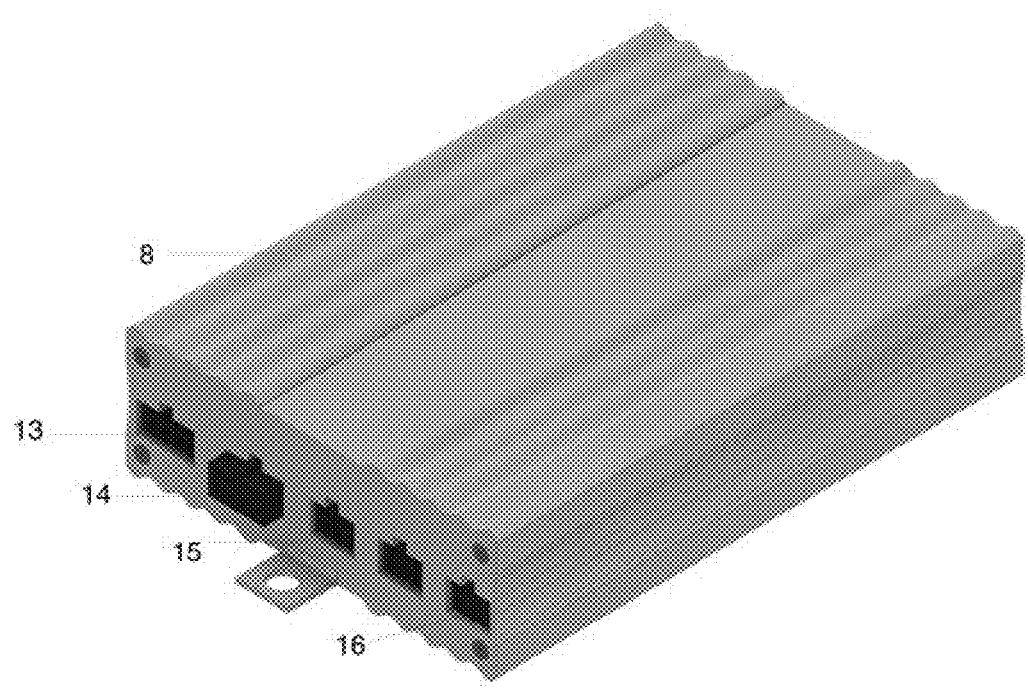
Figure 5:
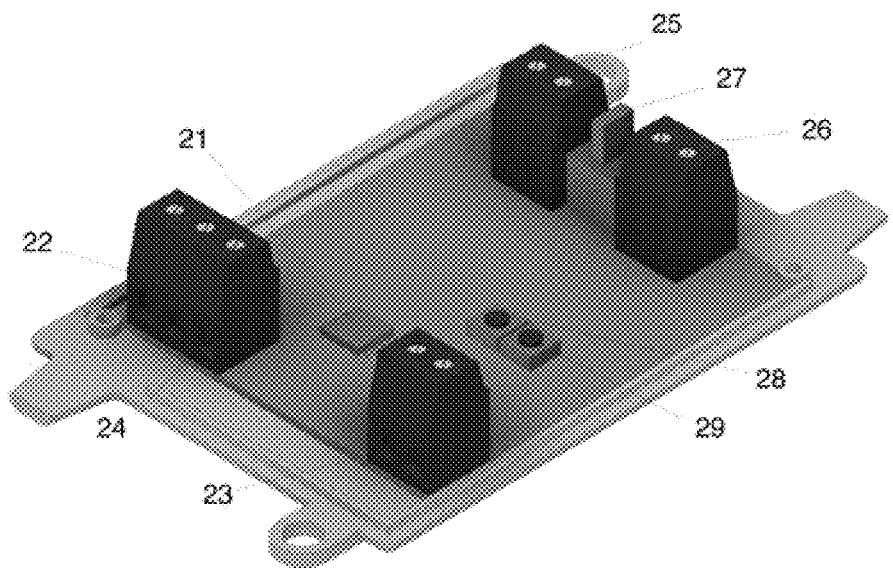
Figure 6:
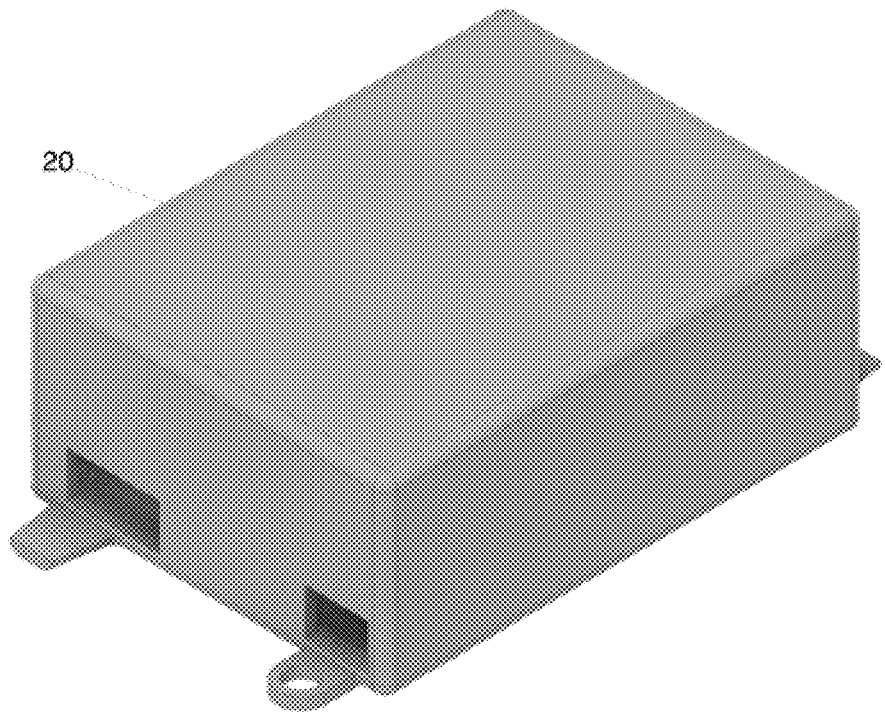
Figure 7:
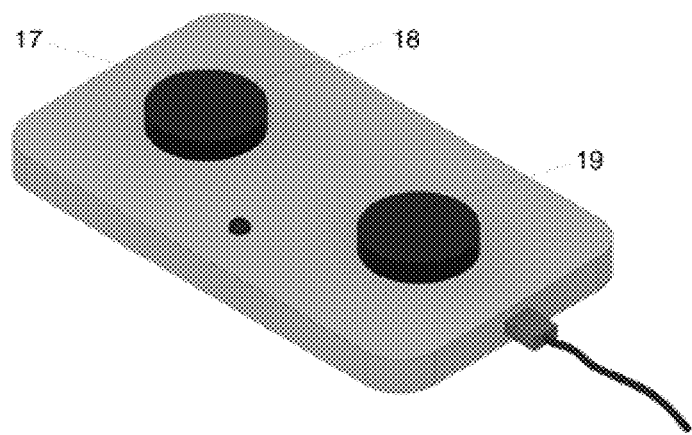
Figure 8:
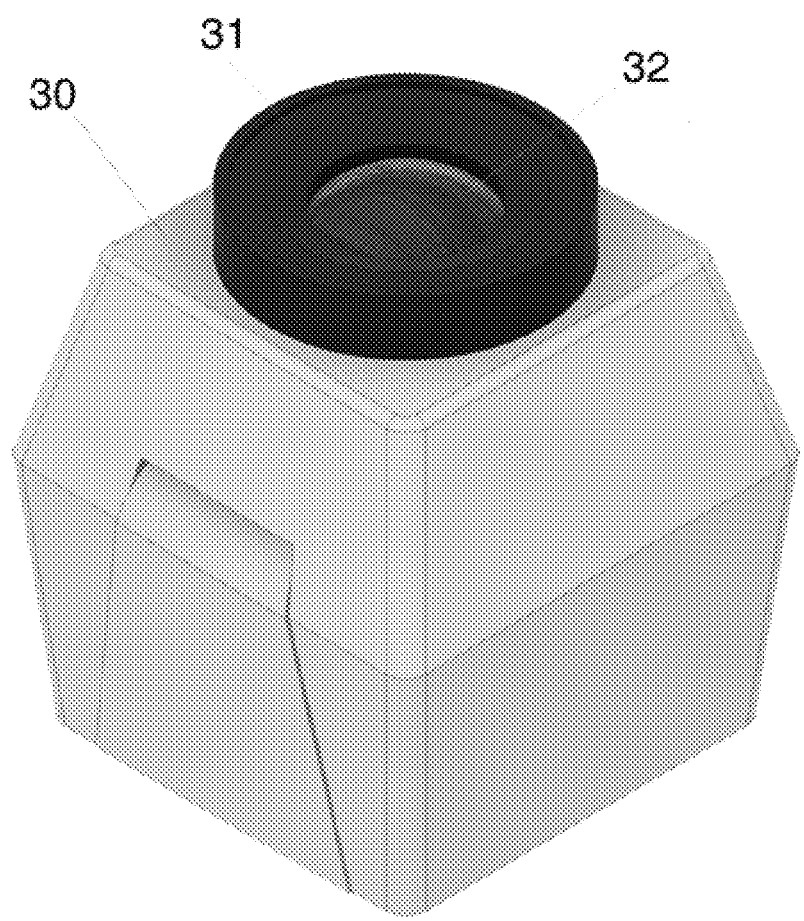

FIG. 3—Head control unit without a case.
FIG. 4—Head control unit in a case.
FIG. 5—Visible to infrared range switching unit without a case.
FIG. 6—Visible to infrared range switching unit in a case.
FIG. 7—Remote control with buttons.
FIG. 8—Night vision camera.

The infrared night vision system comprises visible light sources 1, a head control unit 2, a visible to infrared range switching unit 3, a night vision camera 4, a reflective screen 5 and a device 6 for displaying graphic information on a reflective screen 5, while the electronic components are interconnected by communication means 7.

The head unit 2 comprises a case 8, which houses a system data processing controller 9, a graphic information processing controller 10, a fuse 11, a power connector 12 (10-28 V) and a control signal connector of the visible to infrared range switching unit 3, a connector 13 for the device 6 for displaying graphic information, a connector 14 for a video recorder (not shown in the figures), a connector 15 for the night vision camera 4, a connector 16 for a remote control 17 with a system activation button 18 and a deactivation button 19.

The visible to infrared range switching unit 3 comprises a case 20, a controller 21, power connectors 22 and 23 (+ and −), a connector 24 for the control signal from of the head unit 2, connectors 25 and 26 for selecting the control signal type (+ or −) activation of visible light sources 1, a two-position power voltage switch (12/24 V) 27 of visible light sources 1, programmable buttons 28 and 29 for regulating (+ and −) the brightness of visible light sources 1 in the infrared range.

The camera 4 comprises a case 30, which houses a lens 31 with lens elements 32, a connector (not shown in the figures) to the head control unit 2. Depending on the system configuration and its scope of application, the device 6 for displaying graphic information is a monitor display or a projector (not shown in the figures), while the cases 8, 20 and 30 are equipped with fixing elements (not shown in the figures), as well as wired and wireless communication means 7.

The head unit 2 is connected to the on-board electric system (+ and −) of a vehicle via the power connector 12. The means of communication 7 with the unit 3 is connected to the same connector for transmitting the signal of activation and deactivation. The remote control 17 is connected via the connector 16, the device 6 for displaying graphic information is connected via the connector 13, and the night vision camera 4 is connected via the connector 15.

The visible to infrared range switching unit 3 is connected to the on-board electric system (+ and −) of a vehicle via the power connectors 22 and 23. The means of communication 7 with the head unit 2 is connected to the 24. The two-position voltage switch 27 is installed in accordance with the voltage of the on-board electric system (12 or 24 V) of a quadcopter, a boat or a truck.

Visible light sources 1 are connected to the unit 3 according to the diagram of connection to the vehicle on-board electric system. If the visible light sources 1 are activated by "plus", they should be connected to the connector 25; if the sources are activated by "mass", they should be connected to the connector 26.

The invention is operated as follows.

The button 18 of the remote control 17 sends a control signal for activation of the head unit 2. The unit 2 is activated and sends a control signal for activation of the unit 3, which switches the visible light sources 1 to the infrared range, illuminating objects in the way of a vehicle. The head unit 2 sends a control signal for activation of the camera 4 and the device 6 for displaying graphic information on a reflective screen. The camera 4 is mounted on a vehicle in the direction of the light sources 1. Programmable buttons 28 and 29 (+ and −) adjust the required brightness of illumination of objects with infrared light sources depending on the ambient light. The device 6 for displaying graphic information and the reflective screen 5 are arranged to display the object image 32 on the screen 5 without distortion. The button 19 sends a control signal for deactivation of the head control unit 2 and the system switches off.

This allows achieving the technical result, which is the remote activation of the system and its application in overland cargo, water and air transport, thus expanding the functionality and the scope of application of the night vision system of a passenger car.

The invention claimed is:

1. An infrared night vision system comprising:
   a visible light source;
   a head control unit, the head control unit including controllers for system data processing and graphic information processing;
   a visible to infrared range switching unit, the visible to infrared range switching unit including a data processing controller;
   a night vision camera;
   a reflective screen;
   a device for displaying graphic information on the reflective screen; and communication means interconnecting the visible light source, the head control unit, the visible to infrared range switching unit, the night vision camera, and the device for displaying graphic information, wherein the head control unit is equipped with a remote control device of the infrared night vision system configured to enable remote activation of the infrared night vision system, and the visible to infrared range switching unit comprises a voltage switch of the visible light source configured to enable the infrared night vision system to operate with visible light sources with different power voltages, a brightness controller of the visible light source in the infrared range configured to adjust power of infrared illumination depending on environment illumination, and an activation control signal type switch of the visible light source configured to enable applying the infrared night vision system to light sources with different types of activation signals.

2. The system according to claim 1, characterized in that the remote control is a wireless and/or wired device.

3. The system according to claim 2, characterized in that the wireless device is a smartphone.

4. The system according to claim 2, characterized in that the wired device is a push-button panel in a waterproof case.

5. The system according to claim 1, characterized in that the head control unit comprises means of protection from voltage swing or short circuit in the on-board electrical system.

6. The system according to claim 1, characterized in that the voltage switch of the visible light source is a controller of the control unit designed to enable switching the power voltage of the visible light source.

7. The system according to claim 6, characterized in that the visible to infrared range switching unit comprises a multi-position switch.

8. The system according to claim 1, characterized in that the visible to infrared range switching unit comprises an illumination sensor.

9. The system according to claim 1, characterized in that the brightness controller can be an additional controller equipped with software and/or switching elements connected to the control unit controller.

10. The system according to claim 9, characterized in that the switching elements connected to the control unit controller are programmable buttons for increasing and reducing the brightness of the infrared light source.

11. The system according to claim 1, characterized in that the activation control signal type switch is automatic and/or manual.

12. The system according to claim 11, characterized in that the automatic activation control signal type switch is a controller equipped with software.

13. The system according to claim 11, characterized in that the manual activation control signal type switch is a two-position switch.

14. The system according to claim 11, characterized in that the manual activation control signal type switch is represented by connectors corresponding to the different types of activation signals ("plus" or "minus") of the light sources.

15. The system according to claim 1, characterized in that the camera comprises a dismountable removable lens.

16. The system according to claim 1, characterized in that device for displaying graphic information on a reflective screen is a monitor display and/or a projector.

17. The system according to claim 1, characterized in that the visible light sources are standard halogen and/or LED low and/or high beam headlamps of a vehicle and/or LED modules.

18. The system according to claim 1, further comprising cases for housing the head control unit, the visible to infrared range switching unit, and the night vision camera, characterized in that the cases are dismountable.

19. The system according to claim 1, further comprising cases for housing the head control unit, the visible to infrared range switching unit, and the night vision camera, characterized in that the cases are sealed.

20. The system according to claim 1, further comprising cases for housing the head control unit, the visible to infrared range switching unit, and the night vision camera, characterized in that the cases comprise fixing elements.

* * * * *